(No Model.) 6 Sheets—Sheet 1.

H. O. PEABODY.
FERTILIZER DISTRIBUTER.

No. 375,768. Patented Jan. 3, 1888.

Witnesses:
Walter E. Lombard.
William H. Perry.

Inventor:
Henry O. Peabody.
by N. C. Lombard,
Attorney.

(No Model.)  6 Sheets—Sheet 2.

H. O. PEABODY.
FERTILIZER DISTRIBUTER.

No. 375,768.  Patented Jan. 3, 1888.

Witnesses:
Walter E. Lombard
William H. Parry

Inventor:
Henry O. Peabody,
by N. C. Lombard
Attorney.

(No Model.) 6 Sheets—Sheet 3.

H. O. PEABODY.
FERTILIZER DISTRIBUTER.

No. 375,768. Patented Jan. 3, 1888.

Witnesses:
Walter E. Lombard.
William H. Parry

Inventor:
Henry O. Peabody,
by N. C. Lombard
Attorney.

(No Model.) 6 Sheets—Sheet 4.

H. O. PEABODY.
FERTILIZER DISTRIBUTER.

No. 375,768. Patented Jan. 3, 1888.

Witnesses:
Walter E. Lombard.
William H. Parry

Inventor:
Henry O. Peabody,
by N. C. Lombard
Attorney.

(No Model.) 6 Sheets—Sheet 5.
H. O. PEABODY.
FERTILIZER DISTRIBUTER.

No. 375,768. Patented Jan. 3, 1888.

Witnesses:
Walter E. Lombard
William H. Parry

Inventor:
Henry O. Peabody,
by N. C. Lombard
Attorney.

(No Model.)  
6 Sheets—Sheet 6.

H. O. PEABODY.
FERTILIZER DISTRIBUTER.

No. 375,768.  
Patented Jan. 3, 1888.

Witnesses:  
Walter E. Lombard.  
William H. Parry

Inventor:  
Henry O. Peabody,  
by N. C. Lombard  
Attorney.

UNITED STATES PATENT OFFICE.

HENRY O. PEABODY, OF BOSTON, MASSACHUSETTS.

FERTILIZER-DISTRIBUTER.

SPECIFICATION forming part of Letters Patent No. 375,768, dated January 3, 1888.

Application filed July 30, 1887. Serial No. 245,688. (No model.)

*To all whom it may concern:*

Be it known that I, HENRY O. PEABODY, of Boston, in the county of Suffolk and State of Massachusetts, have invented certain new and useful Improvements in Fertilizer-Distributers, of which the following, taken in connection with the accompanying drawings, is a specification.

My invention relates to that class of fertilizer-distributers in which the material to be distributed is placed in a hollow revolving drum or cylinder and is discharged therefrom through a series of openings in the peripheral wall of said drum or cylinder, and particularly to the devices for measuring and discharging the fertilizer, and is an improvement upon the invention described in the Letters Patent No. 351,462, granted to me October 26, 1886; and it consists in certain novel features of construction, arrangement, and combination of parts, which will be readily understood by reference to the description of the drawings and to the claims to be hereinafter given.

Figure 1:
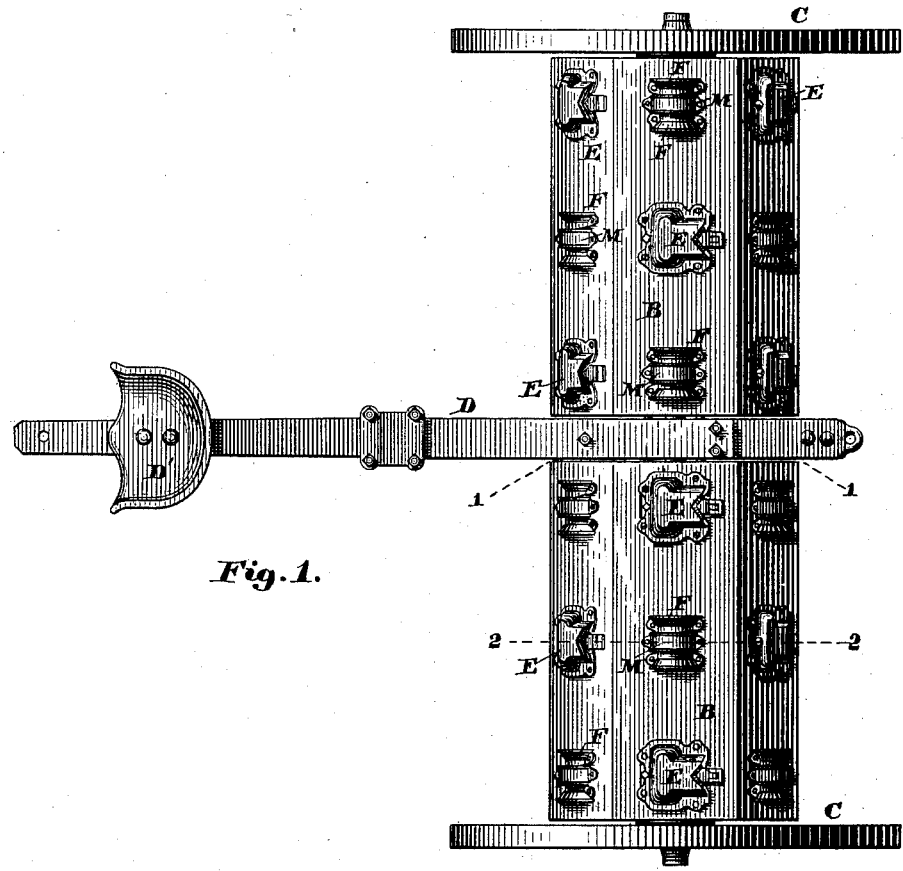
Figure 2:
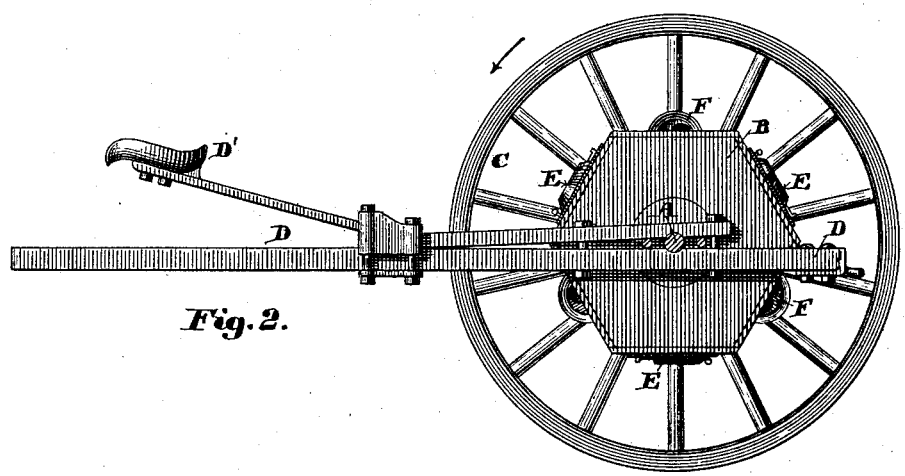
Figure 3:
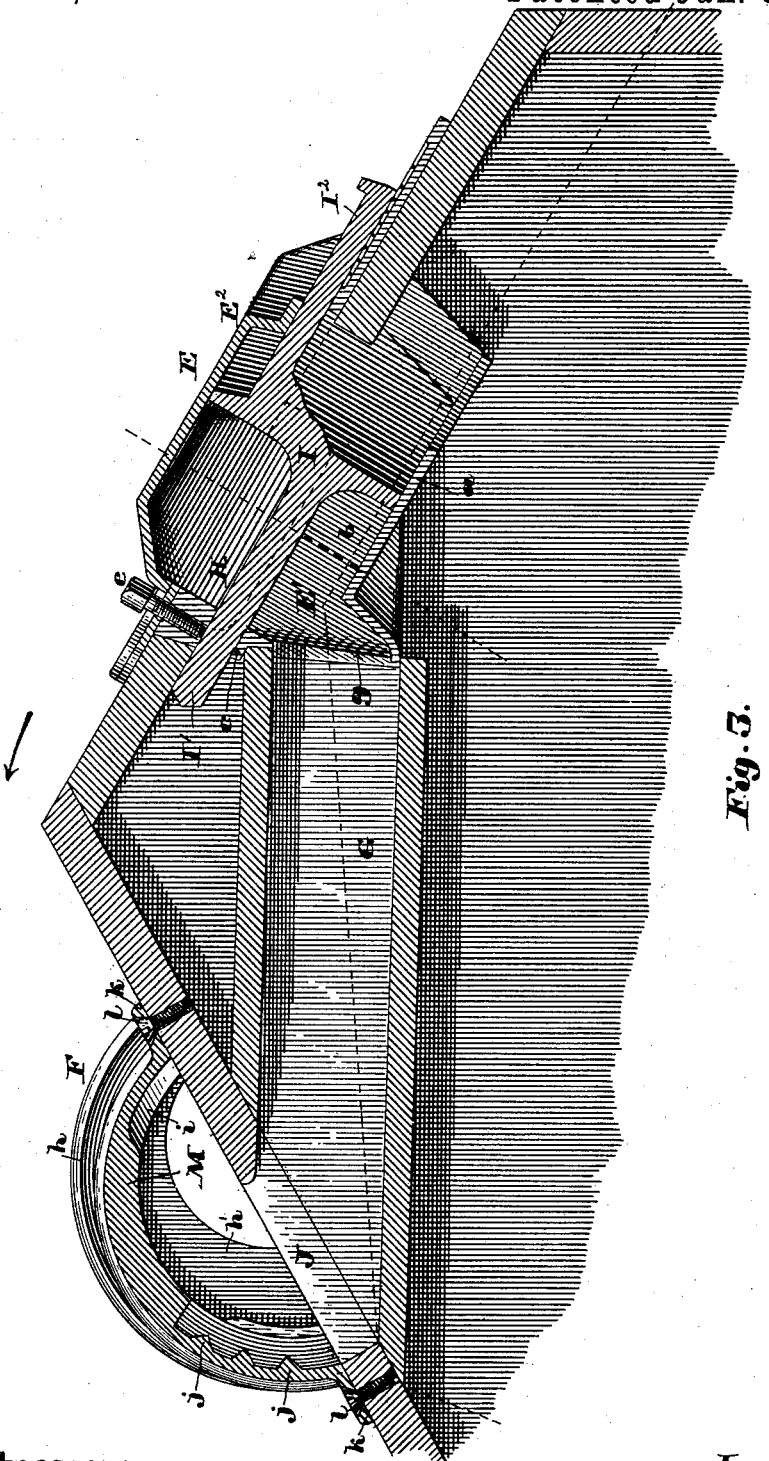
Figure 4:
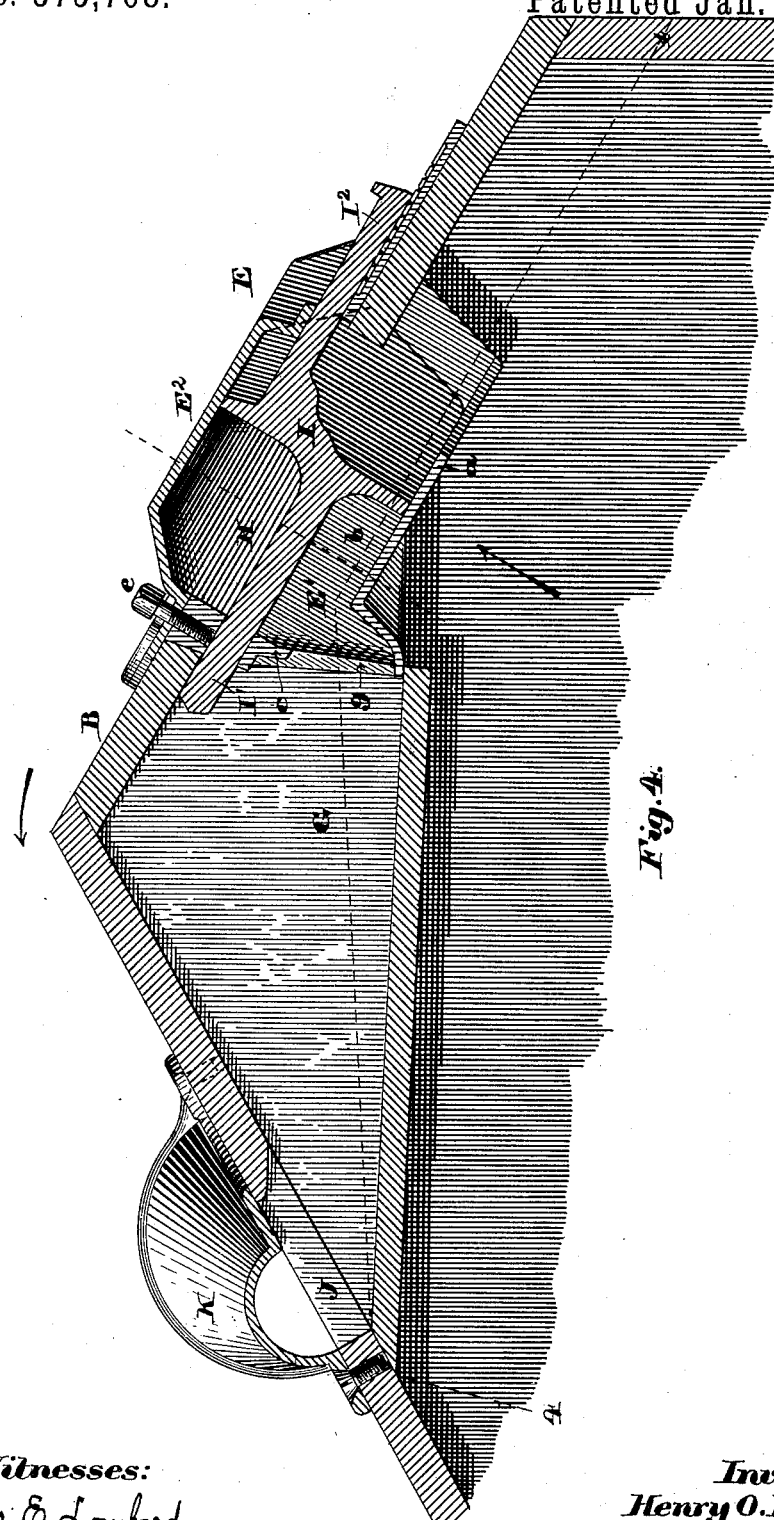
Figure 5:
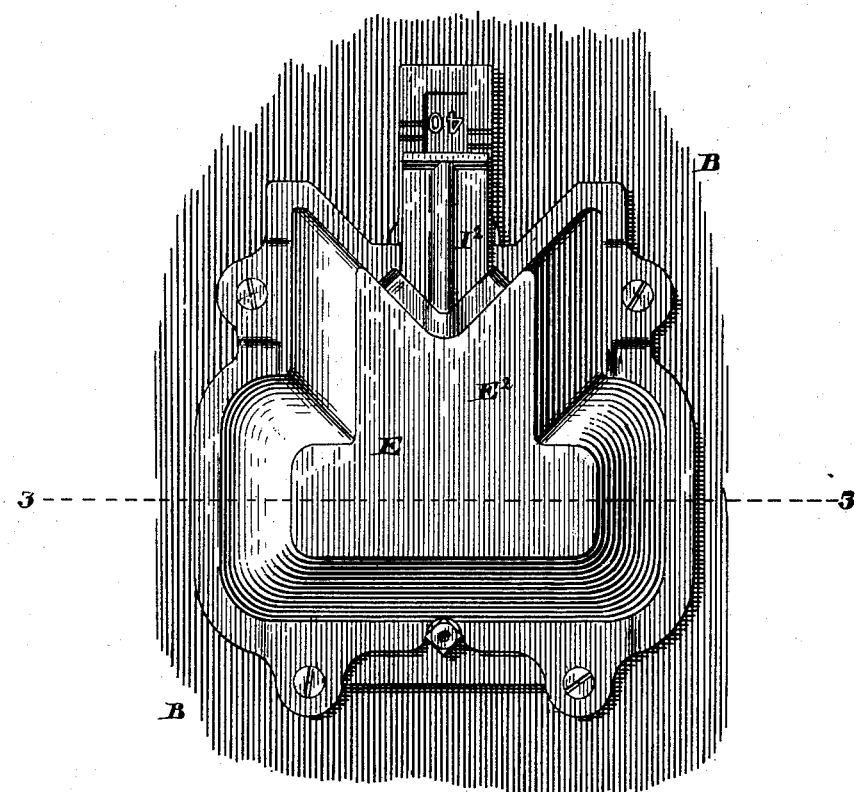
Figure 6:
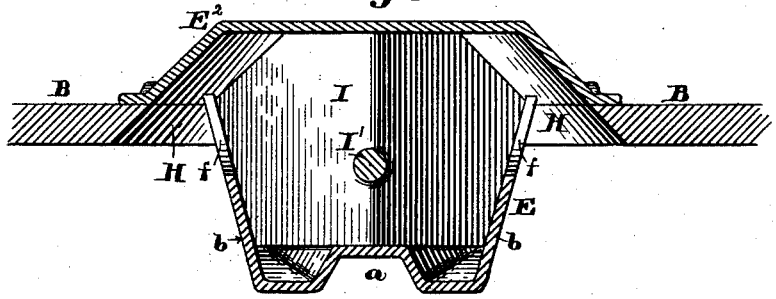
Figure 7:
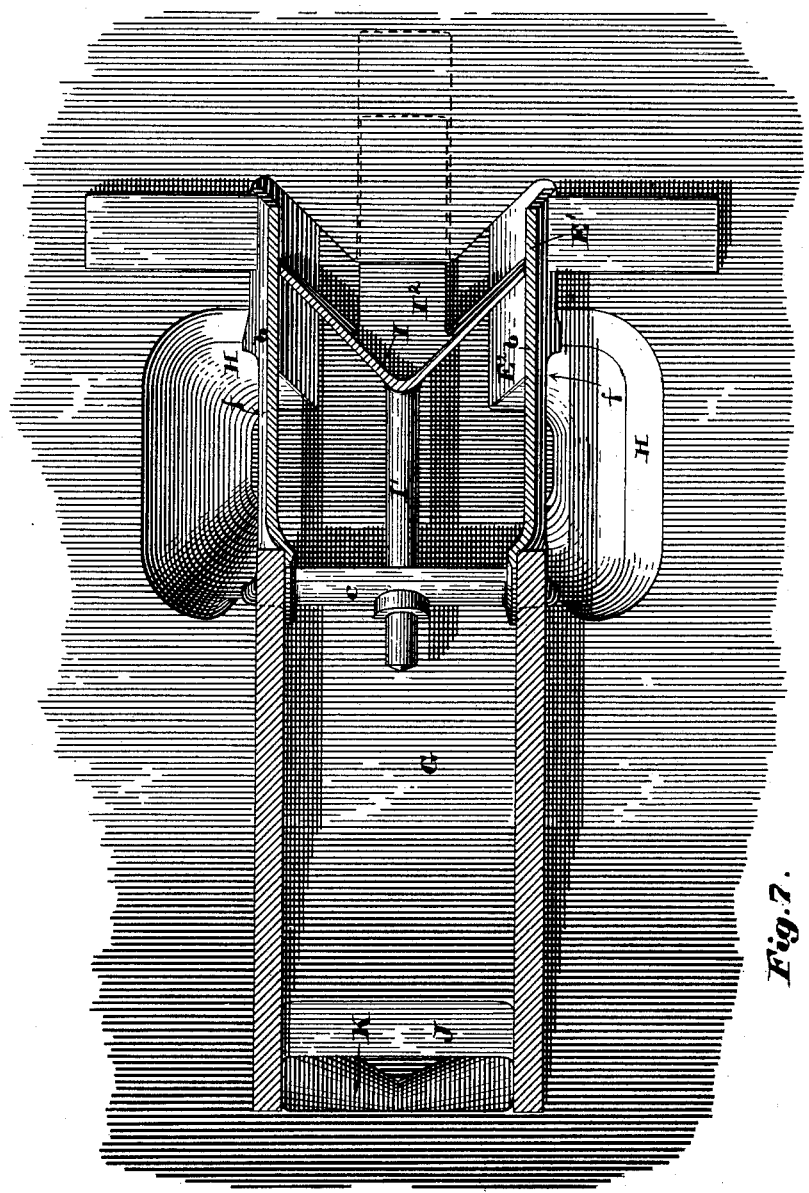
Figure 8:
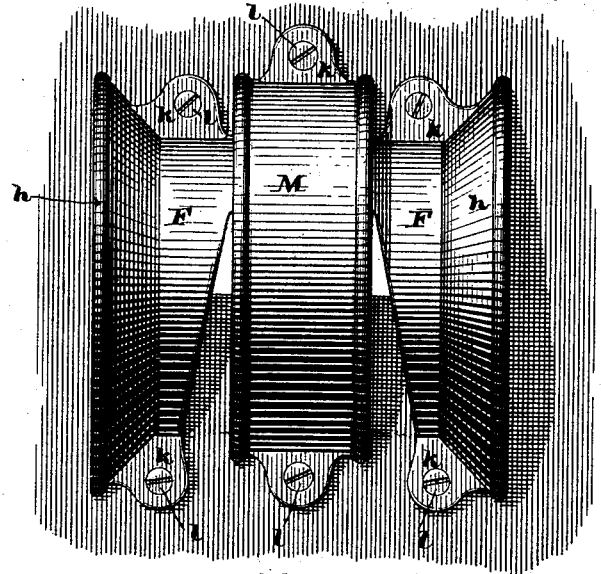
Figure 10:
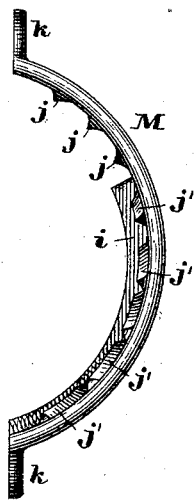
Figure 9:
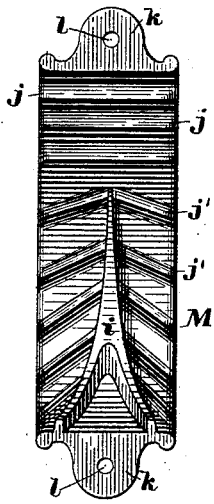
Figure 11:
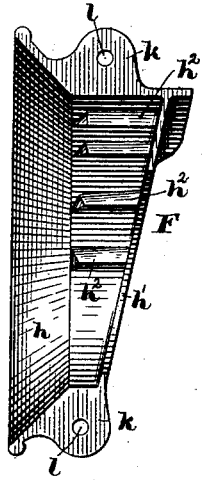
Figure 12:
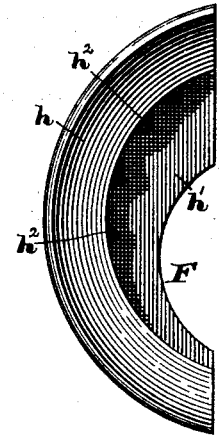

Figure 1 of the drawings is a plan of so much of my improved fertilizer-distributer as is necessary to illustrate my invention. Fig. 2 is a sectional elevation of the same, the cutting-plane being on line 1 1 on Fig. 1. Fig. 3 is a transverse section through a portion of one of the drums, the cutting-plane being on line 2 2 on Fig. 1. Fig. 4 is a similar section, but showing a discharge-cone similar to that shown in said prior patent, No. 351,462, but differently located relative to the measuring-bucket. Fig. 5 is an exterior elevation of one of the measuring buckets or chambers. Fig. 6 is a section on line 3 3 on Fig. 5. Fig. 7 is a section on line 4 4 on Fig. 4, looking outward from the axis of the drum. Fig. 8 is a plan of the preferred discharge cones and guides. Figs. 9 and 10 are respectively an inside elevation and an end elevation of the central segmental discharge-guide, and Figs. 11 and 12 are similar views of the side discharge-segments.

In the drawings, A is the axle, having mounted thereon so as to revolve about the same the drums B B and the wheels C C, and having firmly clamped to the middle thereof the perch D, the forward end of which may be pivoted to the axle of another pair of wheels; or said perch may be extended to a sufficient length to serve as a pole; and D' is the driver's seat, all constructed and arranged to operate substantially as described in said Letters Patent hereinbefore cited.

In the patent above referred to, the measuring-bucket and the semi-conical discharge-chutes were connected directly together and secured in the same flat side of the hexagonal drum, and the measuring-bucket was entirely within the drum, except the flanges for securing it thereto, and the fertilizer in entering said bucket was compelled to move in a direction parallel, or nearly so, to the axis of the drum. This I have found to be somewhat objectionable, on account of the liability of an uncertain quantity of the material falling back into the drum, and thus rendering the measurement unreliable, and also from the fact that the close proximity of the discharge-outlets to the measuring-buckets rendered the discharge irregular and to some extent intermittent. To obviate these objections I separate the measuring-bucket E from the discharge semi-cones or guides F, placing the former in an opening in one flat side of the drum and the latter over an opening in the flat side next in advance of the one in which the measuring-bucket is secured, and connect the bucket E and the discharge cones or guides by the chute or guide-channel G, as shown in Figs. 3, 4, and 7.

The bucket E is made in two parts—the inner portion or main body, E', which is composed of the bottom $a$, the sides $b\ b$, and the end $c$, said sides and end being provided with ears, by which it is secured to the exterior of the drum; and the outer portion, $E^2$, is a cover having inclined sides and an exterior shape, as shown in Figs. 5 and 6, its inner side being chambered out to form a conical-sided chamber outside of the exterior surface of the drum, a portion of said cover at one end being made wider than the distance between the sides of the inner portion, E', so that the inclined sides of the chamber thereof at that end extend some distance beyond the sides of said inner section, and the opening through the shell of the drum is cut flaring inward or inclined to form a continuation of the inclined sides of said chambered cover, as shown in Figs. 6 and 7, so that when said bucket is approaching the under side of the drum as said drum revolves and the fertilizer falls to the bottom thereof it slides down the inclined sides of the recesses H H, formed by the cut through the shell of the drum and the inclined sides of the chamber in the cover, and fills the chamber of the bucket E, the capacity of which is determined by the adjustment of the V-shaped plunger I, which is guided by the stem I' and the arm I², and secured in any desired position by the set-screw e. The sides b b of the main body of the bucket are cut away opposite the recesses H H, as shown at f f in Fig. 6, to facilitate the filling of the bucket.

The end c of the main body E' of the bucket E has cut through it a rectangular opening, g, through which the fertilizer escapes into the chute G, down which it slides as the drum revolves, and is discharged through the semi-conical discharge-passages K, (shown in Fig. 4,) or from the ribbed semicircular guide-plates F F and M. (Shown in Figs. 1, 3, 8, 9, 10, 11, and 12.)

A rectangular opening, J, is cut through the shell of the drum at the end of the chute G opposite to the bucket E, through which the fertilizer passes to reach the semi-conical discharge-passages K or the ribbed semicircular guide-plates F F and M, which are secured over the said opening, as shown.

The two semicircular guide-plates F F are right and left handed, and each has one end made flaring, as at h, and at right angles to the axis of its semi-cylindrical portion, and its opposite end made oblique to said axis and provided with the inwardly-projecting rib h', while upon the inner surface of the semi-cylindrical portion are a series of V-shaped inwardly-projecting ribs, h², extending longitudinally thereof, all as shown in Figs. 8, 11, and 12.

The semicircular plate M has its two ends or edges parallel, and is provided upon its inner surface with the bifurcated rib i, extending about two-thirds around its inner semicircle, its undivided portion being equidistant from the two ends or edges of said plate, as shown in Fig. 9. Said guide-plate is also provided with a series of V-shaped ribs, j, extending longitudinally thereof parallel with each other and with the axis of the semi-cylindrical surface thereof, and with two series of similar ribs, j', arranged one series upon each side of the rib i and extending from said rib i to the edge of said plate, the ribs in each series being arranged oblique to the rib i, but in opposite directions, as shown in Figs. 9 and 10.

Each of the semicircular guide-plates F F and M is provided with two ears, k k, to receive screws, l, by which it is secured to the drum, as shown in Figs. 3, 8, 9, 10, 11, and 12.

By the use of two or more separate and distinct semicircular guide-plates over each discharge-orifice I am enabled to deposit the material measured by each bucket in a greater number of lines, and thus obtain a better or more even distribution than was obtained by the means described in my prior patent before cited.

The operation of my invention is as follows: The drums being charged with the fertilizer material, the measuring-buckets, which are at the lower sides of the drums, will be filled or partially filled with the material by its sliding down the inclined sides of the recesses H H upon each side of each bucket and through the openings f, cut in the sides of said buckets. If, now, the drums be revolved by drawing the machine along the ground, so as to turn them in the direction indicated by the arrows on Figs. 2, 3, and 4, a certain portion of the material contained in said buckets—the amount being determined by the positions of the gage piston or plunger I—is carried upward thereby until said buckets have reached a position directly above the axis of said drums and have commenced to move downward upon the other side of the circle of revolution, when the fertilizer contained in each bucket will be gradually discharged therefrom into the chute G, down which it slides to the opening J, through which it falls upon the semi-conical discharge tubes or passages K, or upon the semicircular guide-plates F F and M, from the several edges of which it is gradually delivered at points equidistant from each other, and falls to the ground in such a manner as to be substantially evenly distributed over the same. The amount discharged from each bucket at each revolution of the drum is regulated by adjusting the V-shaped piston or plunger I in the same manner as described in my prior patent hereinbefore cited.

What I claim as new, and desire to secure by Letters Patent of the United States, is—

1. In a fertilizer-distributer, the combination of a revolving fertilizer-holding drum, a measuring-bucket set in and projecting inward from the shell of said drum, a discharge-opening cut through said drum at some distance from said bucket, but in the same vertical plane, a chute connecting said bucket and discharge-opening, and a device secured to the exterior of said drum directly over said discharge-opening and having provision for delivering the fertilizer in a plurality of rows or lines.

2. In a fertilizer-distributer, the combination of a revolving fertilizer-holding drum and a measuring-bucket fitted to an opening in the shell of said drum, the chamber in which extends both inward and outward from said shell, and the outer portion of which chamber has inclined sides forming an extension of corresponding inclined sides of the opening through the shell of the drum, substantially as described.

3. In combination with a revolving fertilizer-holding drum having a discharge-opening cut through its shell, a plurality of separate and distinct semicircular guide-plates placed over said opening and constructed and arranged to deliver the fertilizer which escapes through said opening in the drum in a plurality of lines, substantially as described.

4. In combination with a revolving fertilizer-holding drum having a discharge-opening cut through its shell, the guide-plates F F, each provided with the flaring end $h$, the oblique rib $h'$, and the V-shaped ribs $h^2$, and the semicircular guide M, provided with the bifurcated rib $i$ and the ribs $j$ and $j'$, all constructed, arranged, and adapted to operate substantially as and for the purposes described.

In testimony whereof I have signed my name to this specification, in the presence of two subscribing witnesses, on this 25th day of July, A. D. 1887.

HENRY O. PEABODY.

Witnesses:
N. C. LOMBARD,
WILLIAM H. PARRY.